United States Patent
Allen

(10) Patent No.: US 8,872,029 B2
(45) Date of Patent: Oct. 28, 2014

(54) SELF-OPENING INNERDUCT FOR A CONDUIT

(75) Inventor: Jerry L. Allen, Centennial, WY (US)

(73) Assignee: WESCO Distribution, Inc., Pittsburgh, PA (US)

( * ) Notice: Subject to any disclaimer, the term of this patent is extended or adjusted under 35 U.S.C. 154(b) by 142 days.

(21) Appl. No.: 13/193,974

(22) Filed: Jul. 29, 2011

(65) Prior Publication Data

US 2012/0073860 A1  Mar. 29, 2012

Related U.S. Application Data

(60) Provisional application No. 61/403,848, filed on Sep. 23, 2010.

(51) Int. Cl.
  *H02G 15/18*  (2006.01)
  *H02G 3/04*  (2006.01)

(52) U.S. Cl.
  CPC .................................. *H02G 3/0487* (2013.01)
  USPC .......................................................... 174/93

(58) Field of Classification Search
  USPC .......................................................... 174/93
  See application file for complete search history.

(56) References Cited

U.S. PATENT DOCUMENTS

| | | | | |
|---|---|---|---|---|
| 31,614 | A * | 3/1861 | Mayall | 138/126 |
| 4,478,661 | A | 10/1984 | Lewis | |
| 4,602,763 | A * | 7/1986 | Gaylin | 254/134.3 FT |
| 4,674,167 | A * | 6/1987 | Hubbard et al. | 29/401.1 |
| 4,946,722 | A | 8/1990 | Moyer | |
| 5,587,115 | A * | 12/1996 | Allen | 264/1.24 |
| 7,085,458 | B2 * | 8/2006 | Morris | 385/110 |
| 7,566,342 | B2 * | 7/2009 | Parker et al. | 623/1.11 |
| 2004/0084203 | A1 | 5/2004 | Gladfelter et al. | |

OTHER PUBLICATIONS

International Search Report and Written Opinion of PCT/US2011/052704 (8 pages—dated Feb. 21, 2012).

* cited by examiner

*Primary Examiner* — Chau N Nguyen
(74) *Attorney, Agent, or Firm* — Renner, Kenner, Greive, Bobak, Taylor & Weber

(57) ABSTRACT

An innerduct (10) for insertion into a conduit includes at least one cell (11) which forms a compartment (14). A self opening stiffener (15) includes branches (16) attached at their ends (17). When the innerduct (10) is on a roll, the branches (16) are positioned adjacent to each other. When the innerduct (10) is being inserted into the conduit, the branches (16) move away from each other to open the compartment.

5 Claims, 1 Drawing Sheet

US 8,872,029 B2

SELF-OPENING INNERDUCT FOR A CONDUIT

CROSS REFERENCE TO RELATED APPLICATION

This application claims priority from U.S. provisional patent application Ser. No. 61/403,848 filed on Sep. 23, 2010, which is incorporated herein by reference in its entirety.

TECHNICAL FIELD

This invention relates to a fabric innerduct which is provided on rolls and inserted into an underground conduit so that it may receive a cable or other item in one or more compartments formed therein. More particularly, this invention relates to such an innerduct in which the compartments will automatically open as the innerduct is being fed from the supply roll and into the conduit.

BACKGROUND ART

Fabric innerducts, such as shown in U.S. Pat. No. 6,262,371, have been very successful in the communications industry. These innerducts are typically flattened and supplied on a roll which may have thousands of feet of the innerduct thereon. Such rolls are then provided at the construction site, and the innerduct is inserted into a conduit which may extend for many miles underground. However, when the innerduct is being dispensed from the roll, it might remain in its flattened condition making it much more difficult to thereafter insert a cable into a somewhat flattened compartment.

The need exists, therefore, for a mechanism which will assure that the compartments of an innerduct are open when being fed into a conduit.

DISCLOSURE OF THE INVENTION

It is thus an object of one aspect of the present invention to provide an innerduct with a compartment which can be generally closed while on a roll and opened as the innerduct is inserted into a conduit.

It is an object of another aspect of the invention to provide an innerduct, as above, in which a spring loaded device maintains the compartment open after insertion into a conduit.

These and other objects of the present invention, as well as the advantages thereof over existing prior art forms, which will become apparent from the description to follow, are accomplished by the improvements hereinafter described and claimed.

In general, an innerduct is adapted to be inserted into a conduit and is adapted to receive a cable or the like. The innerduct has at least one cell having a compartment which is adapted to receive the cable. A spring loaded device in the cell maintains the compartment open when the innerduct is being inserted into the conduit.

In accordance with another aspect of the invention, an innerduct is adapted to be positioned on a reel and thereafter inserted into a conduit. The innerduct has at least one cell forming a compartment. The innerduct has a device having branches attached to the cell, the branches being positioned adjacent to each other when the innerduct is on the reel and being spaced from each other to open the compartment when the innerduct is inserted into the conduit.

A method of installing an innerduct, which has at least one cell forming a compartment, into a conduit includes the steps of providing the innerduct on a roll in a flattened condition whereby the compartment is generally closed, and opening the compartment while introducing the innerduct into the conduit.

A preferred exemplary innerduct according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
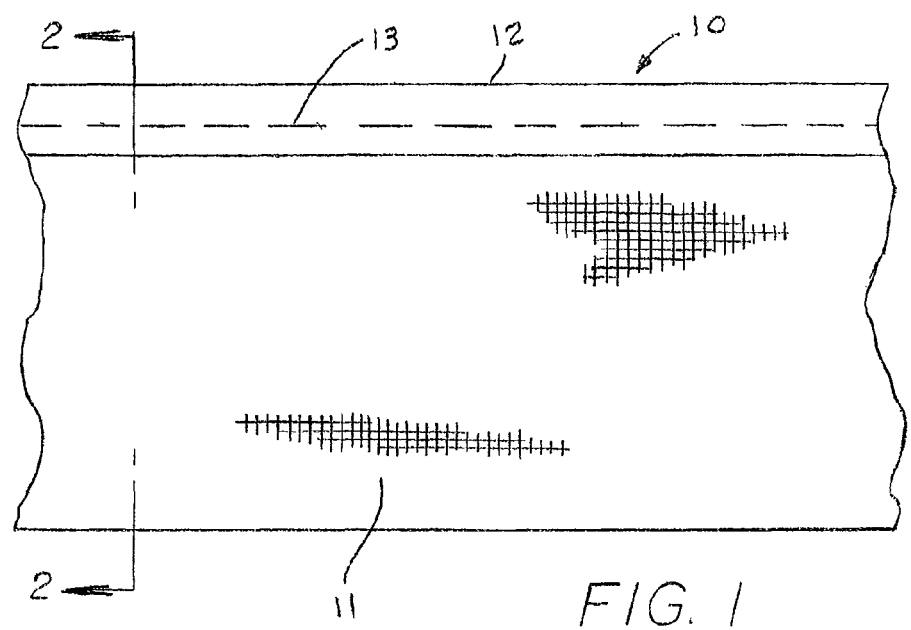
FIG. 1 is a somewhat schematic, fragmented, side elevational view of an innerduct made in accordance with the present invention.

An innerduct made in accordance with the present invention is indicated by the numeral 10. Innerduct 10 is preferably made of a fabric material and can be of the type described in U.S. Pat. No. 6,262,371 to which reference is made for whatever details are necessary for a full understanding of the present invention.

Innerduct 10 can be made up of one or more cells generally indicated by the numeral 11, one cell 11 being shown in the drawings. Each cell 11 is preferably formed by a sheet of material, and the ends 12 of the material can be stitched, as at 13, to form a compartment 14 within cell 11. If innerduct 10 is formed of multiple cells, the ends of each cell can be positioned adjacent to each other and are all stitched together to form multiple connected compartments.

Irrespective of the number of cells, a supply of innerduct 10, which may extend several thousand feet, is typically coiled onto a roll which is provided to a construction site where the innerduct is taken from the roll and introduced into a conduit. Once innerduct 10 is in the conduit, a communications cable or the like can be inserted into the conduit through one of the cells of innerduct 10.

Figure 2:
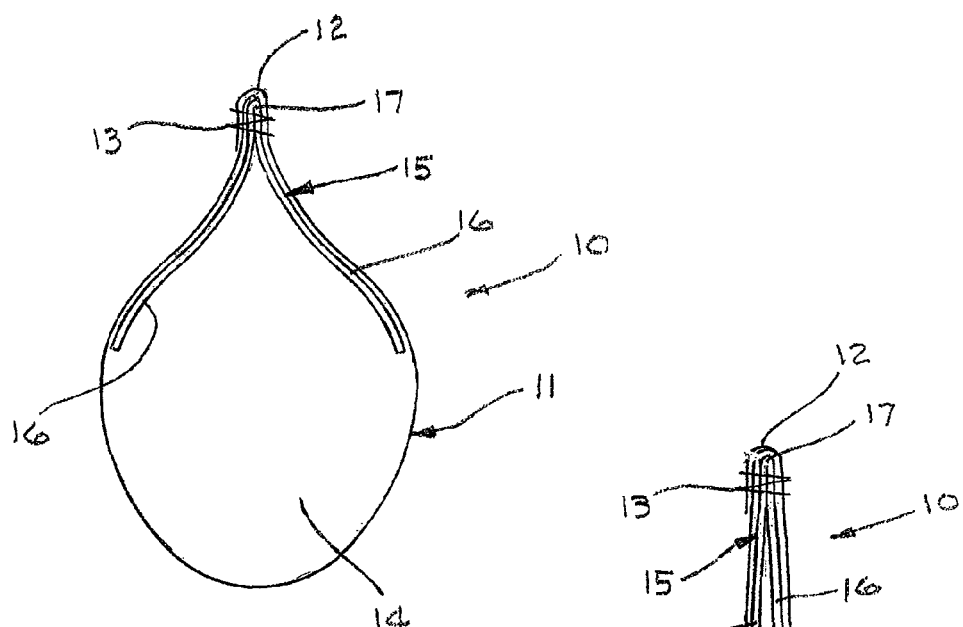
FIG. 2 is a sectional view taken substantially along line 2-2 of FIG. 1.
Figure 3:
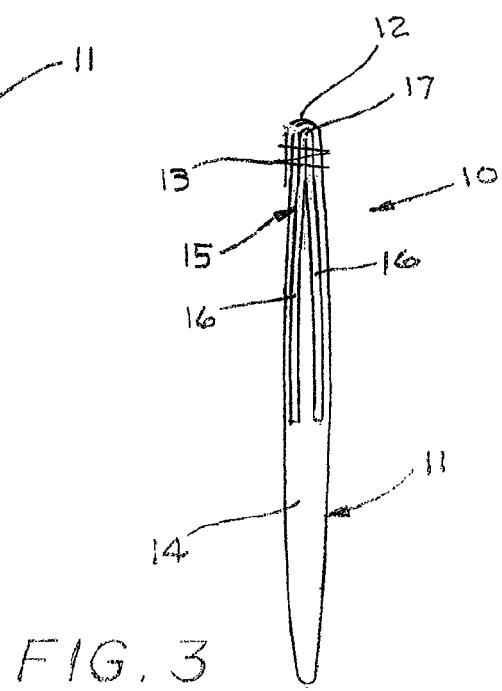
FIG. 3 is a sectional view, like FIG. 2, but showing the innerduct in a collapsed position.

When innerduct 10 is coiled on a roll, the cell 11 is flattened such as shown in FIG. 3, and when it is inserted into a conduit, it should take on the general configuration of FIG. 2 with compartment 14 opened up and ready to receive a cable. However, it has been found that at times the innerduct of the prior art will maintain the shape of FIG. 3 after insertion into a conduit making it more difficult to insert a cable therein. As a result, innerduct 10 is provided with a self opening or spring loaded stiffener generally indicated by the numeral 15. Stiffener 15 is shown as being generally V-shaped having opposed branches 16 attached at their ends 17. Stiffener 15 can be attached to the inside of innerduct 10 so that ends 17 are positioned generally near stitching 13 and branches 16 are attached in any suitable manner, such as by an adhesive, to the opposed sides of the material forming innerduct 10 as shown in FIG. 2. If desired, ends 17 of stiffener 15 can be attached to ends 12 of cell 11 by stitching 13 as shown in the drawings. Stiffener 15 may be made of a polymer, a plastic, or any suitable memory resilient material which will allow it to bend at ends 17 so that when innerduct 10 is on a roll, its branches 16 will be generally adjacent to each other. Then, when innerduct 10 leaves the roll and enters the conduit, by virtue of the memory resilient material of stiffener 15, branches 16 will spring out to open up cell 11 as shown in FIG. 2.

What is claimed is:

1. An innerduct adapted to be inserted into a conduit and adapted to receive a cable comprising at least one cell formed of a fabric sheet having its ends attached to form a compartment adapted to receive the cable, and a device in said cell to maintain such compartment open when the innerduct is inserted into the conduit, said device including opposed branches attached to said cell within said compartment, said branches having ends attached to each other, said device engaging the interior periphery of the compartment but not extending along the entire interior periphery of said compartment.

2. The innerduct of claim 1 wherein stitching attaches said ends of said sheet and also attaches said ends of said branches.

3. An innerduct adapted to be positioned on a reel and thereafter inserted into a conduit comprising at least one cell forming a compartment, a device having opposed branches connected to each other at one end and attached to the cell, said branches being made of a memory resilient material so as to move from a position adjacent to each other when the innerduct is on the reel with said compartment closed to a position spaced from each other causing said compartment to open when the innerduct is inserted into the conduit by engaging the interior periphery of the compartment but without extending along the entire interior periphery of said compartment.

4. An innerduct adapted to be positioned on a reel and thereafter inserted into a conduit comprising at least one cell formed of a fabric sheet having its ends attached to form a compartment, a device having opposed branches attached to the cell and having ends attached to each other, said branches being positioned adjacent to each other when the innerduct is on the reel with said compartment closed and causing said compartment to open when the innerduct is inserted into the conduit by engaging the interior periphery of the compartment but without extending along the entire interior periphery of said compartment.

5. The innerduct of claim 4 wherein stitching attaches said ends of said sheet and also attaches said ends of said branches.

* * * * *